(12) United States Patent
Hayashi et al.

(10) Patent No.: US 11,467,387 B2
(45) Date of Patent: Oct. 11, 2022

(54) IMAGE PROCESSING APPARATUS AND IMAGE PROCESSING METHOD

(71) Applicant: SONY CORPORATION, Tokyo (JP)

(72) Inventors: Kunihiko Hayashi, Kanagawa (JP); Toru Mitome, Tokyo (JP); Shinji Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 7 days.

(21) Appl. No.: 16/928,290

(22) Filed: Jul. 14, 2020

(65) Prior Publication Data

US 2020/0341252 A1    Oct. 29, 2020

Related U.S. Application Data

(63) Continuation of application No. 14/429,133, filed as application No. PCT/JP2013/005097 on Aug. 29, 2013, now Pat. No. 10,739,573.

(30) Foreign Application Priority Data

Sep. 24, 2012 (JP) .................................. 2012-209420

(51) Int. Cl.
    *H04N 9/47*    (2006.01)
    *H04N 7/18*    (2006.01)
    (Continued)

(52) U.S. Cl.
    CPC .......... *G02B 21/008* (2013.01); *G06T 3/4015* (2013.01); *G06V 10/40* (2022.01);
    (Continued)

(58) Field of Classification Search
    CPC ........ G06T 3/4007; H04N 1/58; G06V 10/40; G06V 10/44
    See application file for complete search history.

(56) References Cited

U.S. PATENT DOCUMENTS 4,506,294 A * 3/1985 Nagumo ................. H04N 9/093
                                                 348/E9.007
5,148,270 A * 9/1992 Someya ............... H04N 7/0152
                                                 348/E7.005
(Continued)

FOREIGN PATENT DOCUMENTS

CN        1574973 A      2/2005
CN      102893305 A      1/2013
(Continued)

OTHER PUBLICATIONS

International Search Report and Written Opinion of PCT Application No. PCT/JP2013/005097, dated Oct. 29, 2013, 08 pages of English Translation and 07 pages of ISRWO.
(Continued)

*Primary Examiner* — Fabio S Lima
(74) *Attorney, Agent, or Firm* — Chip Law Group

(57) ABSTRACT

An image processing apparatus includes an output value obtaining unit, a first interpolation unit, a second interpolation unit, an image generation unit, and a first edge detection unit. The output value obtaining unit obtains respective output values of a plurality of light-receiving elements from an image sensor including the plurality of light-receiving elements arranged two-dimensionally. The first interpolation unit uses a first interpolation algorithm to interpolate a pixel value. The second interpolation unit uses a second interpolation algorithm to interpolate a pixel value. The image generation unit generates an image based on a pixel value, which is interpolated by the first interpolation unit. The first edge detection unit detects an edge using a first edge detection algorithm based on a pixel value, which is interpolated by the second interpolation unit.

16 Claims, 8 Drawing Sheets

(51) Int. Cl.
*G02B 21/00* (2006.01)
*G06T 3/40* (2006.01)
*G06V 10/40* (2022.01)
*G06V 10/44* (2022.01)
*H04N 7/01* (2006.01)
*G06V 10/46* (2022.01)

(52) U.S. Cl.
CPC ............... *G06V 10/44* (2022.01); *H04N 7/01* (2013.01); *G06V 10/467* (2022.01)

(56) References Cited

U.S. PATENT DOCUMENTS

| | | | | |
|---|---|---|---|---|
| 6,404,927 | B1* | 6/2002 | Li | H04N 11/042 |
| | | | | 382/245 |
| 9,516,389 | B1* | 12/2016 | Cheng | H04N 21/4318 |
| 2004/0135926 | A1* | 7/2004 | Song | H04N 7/012 |
| | | | | 348/E5.064 |
| 2005/0007470 | A1 | 1/2005 | Kimura et al. | |
| 2005/0030396 | A1* | 2/2005 | Park | H04N 5/208 |
| | | | | 348/E5.064 |
| 2006/0050082 | A1* | 3/2006 | Jeffrey | H04N 9/04515 |
| | | | | 348/E9.01 |
| 2006/0050083 | A1 | 3/2006 | Lachine et al. | |
| 2007/0211307 | A1* | 9/2007 | Uvarov | G06T 7/13 |
| | | | | 358/463 |
| 2009/0059094 | A1* | 3/2009 | Yi | H04N 1/19594 |
| | | | | 348/744 |
| 2009/0135278 | A1* | 5/2009 | Aragaki | H04N 9/04557 |
| | | | | 348/E9.002 |
| 2009/0195668 | A1* | 8/2009 | Koh | H04N 5/23299 |
| | | | | 348/E5.022 |
| 2010/0245620 | A1* | 9/2010 | Arai | H04N 5/35563 |
| | | | | 348/E5.037 |
| 2011/0199394 | A1* | 8/2011 | Toraichi | H04N 1/3935 |
| | | | | 382/199 |
| 2012/0140983 | A1* | 6/2012 | Kishima | G06T 7/174 |
| | | | | 382/103 |
| 2012/0212653 | A1 | 8/2012 | Kanemitsu et al. | |
| 2013/0010146 | A1 | 1/2013 | Kasahara | |
| 2013/0176485 | A1* | 7/2013 | Aiba | G09G 3/3611 |
| | | | | 348/441 |

FOREIGN PATENT DOCUMENTS

| | | |
|---|---|---|
| EP | 1489556 A2 | 12/2004 |
| EP | 2543017 A1 | 1/2013 |
| JP | 2000-331143 A | 11/2000 |
| JP | 2005-012479 A | 1/2005 |
| JP | 2009-125432 A | 6/2009 |
| JP | 2011-180925 A | 9/2011 |
| JP | 2012-117930 A | 6/2012 |
| JP | 2012-175241 A | 9/2012 |
| KR | 10-0627706 B1 | 9/2006 |
| KR | 10-2012-0127627 A | 11/2012 |
| WO | 2011/108620 A1 | 9/2011 |

OTHER PUBLICATIONS

International Preliminary Report on Patentability of PCT Application No. PCT/JP2013/005097, dated Apr. 2, 2015, 08 pages of English Translation and 04 pages of IPRP.

Non-Final Office Action for U.S. Appl. No. 14/429,133, dated Jul. 27, 2016, 20 pages.

Non-Final Office Action for U.S. Appl. No. 14/429,133, dated Jul. 27, 2017, 16 pages.

Non-Final Office Action for U.S. Appl. No. 14/429,133, dated Sep. 10, 2018, 24 pages.

Non-Final Office Action for U.S. Appl. No. 14/429,133, dated Oct. 2, 2019, 18 pages.

Final Office Action for U.S. Appl. No. 14/429,133, dated Jan. 20, 2017, 17 pages.

Final Office Action for U.S. Appl. No. 14/429,133, dated Feb. 12, 2018, 17 pages.

Final Office Action for U.S. Appl. No. 14/429,133, dated Apr. 5, 2019, 20 pages.

Advisory Action for U.S. Appl. No. 14/429,133, dated May 17, 2018, 03 pages.

Advisory Action for U.S. Appl. No. 14/429,133, dated Jun. 27, 2019, 03 pages.

Notice of Allowance for U.S. Appl. No. 14/429,133, dated Apr. 6, 2020, 09 pages.

* cited by examiner

IMAGE PROCESSING APPARATUS AND IMAGE PROCESSING METHOD

CROSS REFERENCE TO RELATED APPLICATIONS

This application is continuation application of U.S. patent application Ser. No. 14/429,133, filed on Mar. 18, 2015, which is a U.S. National Phase of International Patent Application No. PCT/JP2013/005097 filed on Aug. 29, 2013, which claims priority benefit of Japanese Patent Application No. JP 2012-209420 filed in the Japan Patent Office on Sep. 24, 2012. Each of the above-referenced applications is hereby incorporated herein by reference in its entirety.

TECHNICAL FIELD

The present technology relates to digital imaging that can be used for pathological diagnosis or the like.

BACKGROUND ART

In digital imaging of microscopic image used in the filed such as pathological diagnosis, a sample (slide) on which a pathological tissue or the like is fixed is imaged by an imaging apparatus via a microscope. Here, an image of the range that needs to be observed by the microscope in the sample (hereinafter, observation target range) is generally captured a plurality of times while moving the visual filed range of the imaging apparatus because the visual field range of the imaging apparatus via the microscope is fine. The captured images (hereinafter, microscopic images) are brought into alignment with each other and bonded to each other, thereby generating a microscopic image in the observation target range.

In many cases, the entire sample is imaged at another magnification or by another optical system or another image sensor before microscopic imaging, and image processing is performed on the thus-obtained image (hereinafter, entire image), thereby detecting the above-mentioned observation target range. In Patent Document 1, for example, "specimen area detection method" in which the observation target range is detected from an image of the entire sample and the range is imaged via a microscope is disclosed.

The entire image is used also as a list image (thumbnail image) for an observer to search for a desired microscopic image. Furthermore, information (character, barcode, etc.) or the like for identifying the sample is displayed on the sample in some cases, and such information is read from the entire image.

CITATION LIST

Patent Document

Patent Document 1: Japanese Patent Application Laid-open No. 2012-117930

DISCLOSURE OF THE INVENTION

Problem to be Solved by the Invention

In the above-mentioned digital imaging, however, problems related to generation of the entire image occur. Specifically, when the entire image is generated from the output of the image sensor (CCD or the like) of the imaging apparatus that captures the entire image, requirements of visibility of the list image and accuracy of detecting observation target range and reading information are needed and important. An image with high visibility and an image on which it is easy to perform image processing have different properties in many cases, and it may be difficult to satisfy both of them.

The entire image is used also as a list image as described above. Moreover, the image apparatus that captures the entire image has not so high resolution and the display is further scaled down in some cases. The visibility of the list image when it is scaled down and displayed is important. On the other hand, it is not favorable to lower the accuracy of the image processing for prioritizing the visibility because the observation target range is identified and information is recognized based on the results of the image processing performed on the entire image. In addition, the method of taking the entire image a plurality of times by an imaging system having a high magnification is desired to be avoided because an enormous amount of samples needs to be observed by a microscope and the imaging process is desired to be performed at higher speed in the field such as pathological diagnosis.

In view of the circumstances as described above, it is an object of the present technology to provide an image processing apparatus, an image processing program, and an image processing method that are capable of achieving visibility of the entire image used for capturing a microscopic image and accuracy of image processing at the same time.

Means for Solving the Problem

In order to achieve the above-mentioned object, the image processing apparatus according to an embodiment of the present technology includes an output value obtaining unit, a first interpolation unit, a second interpolation unit, an image generation unit, and a first edge detection unit.

The output value obtaining unit obtains respective output values of a plurality of light-receiving elements from an image sensor including the plurality of light-receiving elements arranged two-dimensionally.

The first interpolation unit uses a first interpolation algorithm to interpolate a pixel value of a pixel corresponding to the respective light-receiving elements based on the output value.

The second interpolation unit uses a second interpolation algorithm different from the first interpolation algorithm to interpolate a pixel value of a pixel corresponding to the respective light-receiving elements based on the output value.

The image generation unit generates an image based on a pixel value of a pixel corresponding to the respective light-receiving elements, which is interpolated by the first interpolation unit.

The first edge detection unit detects an edge using a first edge detection algorithm based on a pixel value of a pixel corresponding to the respective light-receiving elements, which is interpolated by the second interpolation unit.

The output value obtaining unit obtains the output values of the plurality of light-receiving elements of the image sensor. Here, the output value of each light-receiving element represents the intensity of light that has been transmitted through a color filter of each color (e.g., R, G, and B) provided to each light-receiving element. Therefore, in order to generate the output value (e.g., RGB value) corresponding to each light-receiving element, there is a need to interpolate (demosaic) a pixel value corresponding to each light-receiving element based on the output value of each light-receiving element. With the above-mentioned configuration, when a pixel value is interpolated based on the output value of each light-receiving element, the first interpolation unit uses the first interpolation algorithm to interpolate a pixel value and the second interpolation unit uses the second interpolation algorithm to interpolate a pixel value. Therefore, as an interpolation algorithm for generating an image (first interpolation algorithm) and an interpolation algorithm for edge detection (second interpolation algorithm), it is possible to employ an interpolation algorithm that is suitable for the respective interpolation algorithms. Therefore, according to the above-mentioned configuration, it is possible to achieve the visibility of an image and accuracy of edge detection at the same time. It should be noted that because the edge detected by the edge detection can be used for detecting the microscopic observation area or recognizing information displayed on the sample, the accuracy of these processes can be improved if the accuracy of edge detection is improved.

The first interpolation algorithm may be an interpolation algorithm that interpolates the pixel value so that a difference between pixel values of pixels corresponding to adjacent light-receiving elements is small, and the second interpolation algorithm may be an interpolation algorithm that interpolates the pixel value so that a difference between pixel values of pixels corresponding to adjacent light-receiving elements is larger than the first interpolation algorithm.

The first interpolation algorithm for generating an image is an interpolation algorithm that interpolates a pixel value so that the difference between pixel values of pixels corresponding to adjacent light-receiving elements is small, thereby reducing the pixel value difference (contrast) between the pixels in the generated image. That is, it is possible to generate an image having an excellent visibility in which the pixel value changes smoothly. Moreover, the second interpolation algorithm for edge detection is an interpolation algorithm that interpolates a pixel value so that the difference between pixel values of pixels corresponding to adjacent light-receiving elements is large, thereby improving the accuracy of detecting an edge (detected using the pixel value difference) in the edge detection process.

The image processing apparatus may further include an area detection unit that detects an area based on the detection results obtained from the first edge detection unit.

As described above, the first edge detection unit can detect an edge with high accuracy based on the pixel value interpolated by the second interpolation unit using the second interpolation algorithm. Therefore, the area detection unit that uses the detection results obtained from the first edge detection unit can detect an area with high accuracy.

The image processing apparatus may further include a second edge detection unit that uses a second edge detection algorithm different from the first edge detection algorithm to detect an edge based on the pixel value of the pixel corresponding to the respective light-receiving elements, which is interpolated by the second interpolation unit, and an information recognition unit that recognizes information based on the detection result obtained from the second edge detection unit.

The second edge detection unit can detect an edge with high accuracy based on the pixel value interpolated by the second interpolation unit, similarly to the first edge detection unit, and the information recognition unit that uses the second edge detection results can recognize information with high accuracy. By separately using the first edge detection algorithm for detecting an edge used for detecting an area and the second edge detection algorithm for detecting an edge used for recognizing information, it is possible to use an edge detection algorithm suitable for the respective processes. The second interpolation unit may perform YUV conversion as well as the interpolation of the pixel value.

Because the pixel value interpolated (generated) by the second interpolation unit is used for edge detection, YUV format is more favorable than RGB format. Therefore, the second interpolation unit can convert the pixel value in the RGB format, which is generated by the interpolation, into the YUV format. Here, the second interpolation unit performs YUV conversion of a pixel value (for each pixel) as well as the interpolation of a pixel value, thereby reducing the processing time as compared with the case where YUV conversion is performed on all the pixels after the pixel values of all the pixels are interpolated.

The first interpolation algorithm may be a linear interpolation method, and the second interpolation algorithm may be a gradient method.

The linear interpolation method is an interpolation algorithm that interpolates a pixel value so that the difference between pixel values of pixels corresponding to adjacent light-receiving elements is small, and is favorable as the first interpolation algorithm. The gradient method is an interpolation algorithm that interpolates a pixel value so that the difference between pixel values of pixels corresponding to adjacent light-receiving elements is large, and is favorable as the second interpolation algorithm.

The area detection unit may detect an area including an edge in the detection results obtained from the first edge detection unit as an observation target area in a sample, and the information recognition unit may recognize a character or code displayed on the sample based on the detection results obtained from the second edge detection unit.

The area of a pixel including the edge detected by the first edge detection unit can be determined to be an area in which a specimen (pathological tissue or the like) exists in the sample. This is because the edge is not originally detected in an area in which a specimen does not exist (on a glass slide or the like). The area detection unit can use the detection results obtained from the first edge detection unit in which an edge is detected with high accuracy to detect the observation target area (i.e., area in which a specimen exists) with high accuracy. Moreover, in the case where a character or code (barcode or the like) is displayed on a sample, the information recognition unit can use the detection results obtained from the second edge detection in which an edge is detected with high accuracy to detect a character or code with high accuracy and to recognize it as information.

The image processing apparatus may further include a third interpolation unit that uses a third interpolation algorithm that is different from the first interpolation algorithm and the second interpolation algorithm to interpolate a pixel value of a pixel corresponding to the respective light-receiving elements based on the output value, and a second edge detection unit that uses a second edge detection algorithm different from the first edge detection algorithm to detect an edge based on a pixel value of a pixel of each light-receiving element, which is interpolated by the third interpolation unit.

According to this configuration, in addition to the first interpolation unit and the second interpolation unit, the third interpolation unit uses the third interpolation algorithm to interpolate a pixel value. Accordingly, the second algorithm in which the first edge detection unit uses the interpolation results (pixel value) and the third interpolation algorithm in which the second edge detection unit uses the interpolation results (pixel value) can be an interpolation algorithm suitable for the respective edge detection process. The first edge detection unit and the second edge detection unit perform edge detection. However, in the case where the edge detection results are used for difference processes as in the area detection and information recognition to be described later, different edge detection algorithms are suitable for the respective processes in some cases. In such a case, by using an interpolation algorithm that is suitable for edge detection of the respective edge detection algorithm at the stage of the interpolation of a pixel value, it is possible to improve the accuracy of edge detection.

The first interpolation algorithm may be an interpolation algorithm that interpolates the pixel value so that a difference between pixel values of pixels corresponding to adjacent light-receiving elements is small, the second interpolation algorithm may be an interpolation algorithm that interpolates the pixel value so that a difference between pixel values of pixels corresponding to adjacent light-receiving elements is larger than the first interpolation algorithm, and the third interpolation algorithm may be an interpolation algorithm that interpolates the pixel value so that a difference between pixel values of pixels corresponding to adjacent light-receiving elements is larger than the first interpolation algorithm.

The first interpolation algorithm for generating an image is an interpolation algorithm that interpolates a pixel value so that the difference between pixel values of pixels corresponding to adjacent light-receiving elements is small, thereby reducing the pixel value difference between pixels in the generated image. That is, it is possible to generate an image having an excellent visibility in which the pixel value changes smoothly. Moreover, the second interpolation algorithm and the third interpolation algorithm for detecting an edge are each an interpolation algorithm that interpolates a pixel value so that the difference between pixel values of pixels corresponding to adjacent light-receiving elements is large, thereby improving the accuracy of detecting an edge in the edge detection process.

The image processing apparatus may further include an area detection unit that detects an area based on the detection results obtained from the first edge detection unit, and an information recognition unit that recognizes information based on the detection results obtained from the second edge detection unit.

As described above, the first edge detection unit can detect an edge with high accuracy based on a pixel value interpolates by the second interpolation unit using the second interpolation algorithm. Therefore, the area detection unit that uses the detection results obtained from the first edge detection unit can detect an area with high accuracy. Moreover, the second edge detection unit can detect an edge with high accuracy based on the pixel value interpolated by the third interpolation unit, and the information recognition unit that uses the second edge detection results can recognize information with high accuracy.

The second interpolation unit may perform YUV conversion as well as the interpolation of the pixel value, and the third interpolation unit may perform YUV conversion as well as the interpolation of the pixel value.

The second interpolation unit and the third interpolation unit perform YUV conversion of a pixel value (for each pixel) as well as the interpolation of a pixel value, thereby reducing the processing time as compared with the case where YUV conversion is performed on all the pixels after the pixel values of all the pixels are interpolated.

In the image processing apparatus, the first interpolation algorithm is a linear interpolation method, the second interpolation algorithm is a gradient method, and the third interpolation algorithm is an advanced color plane interpolation method.

The linear interpolation method is an interpolation algorithm that interpolates a pixel value so that the difference between pixel values of pixels corresponding to adjacent light-receiving elements is small, and is favorable as the first interpolation algorithm. The gradient method is an interpolation algorithm that interpolates a pixel value so that the difference between pixel values of pixels corresponding to adjacent light-receiving elements is large, and is favorable as the second interpolation algorithm. The advanced color plane interpolation method (ACPI method) is an interpolation algorithm that interpolates a pixel value so that the difference between pixel values of pixels corresponding to adjacent light-receiving elements is large, and is favorable as the third interpolation algorithm.

In the image processing apparatus, the area detection unit detects the area including an edge in the detection results obtained from the first edge detection unit as an observation target area in a sample, and the information recognition unit recognizes the character or code displayed on the sample based on the detection results obtained from the second edge detection unit.

The area detection unit can use the detection results obtained from the first edge detection unit in which an edge is detected with high accuracy to detect the observation target area (i.e., area in which a specimen exists) with high accuracy. Moreover, the information recognition unit uses the detection results obtained from the second edge detection unit in which an edge is detected with high accuracy to detect a character or code with high accuracy and to recognize it as information.

In order to achieve the above-mentioned object, an image processing program according to an embodiment of the present technology causes an information processing apparatus to function as an output value obtaining unit, a first interpolation unit, a second interpolation unit, an image generation unit, and a first edge detection unit.

The output value obtaining unit obtains respective output values of a plurality of light-receiving elements from an image sensor including the plurality of light-receiving elements arranged two-dimensionally.

The first interpolation unit uses a first interpolation algorithm to interpolate a pixel value of a pixel corresponding to the respective light-receiving elements based on the output value.

The second interpolation unit uses a second interpolation algorithm different from the first interpolation algorithm to interpolate a pixel value of a pixel corresponding to the respective light-receiving elements based on the output value.

The image generation unit generates an image based on a pixel value of a pixel corresponding to the respective light-receiving elements, which is interpolated by the first interpolation unit.

The first edge detection unit detects an edge using a first edge detection algorithm based on a pixel value of a pixel corresponding to the respective light-receiving elements, which is interpolated by the second interpolation unit.

In order to achieve the above-mentioned object, an image processing method according to an embodiment of the present technology includes obtaining, by an output value obtaining unit, respective output values of a plurality of light-receiving elements from an image sensor including the plurality of light-receiving elements arranged two-dimensionally.

A first interpolation unit uses a first interpolation algorithm to interpolate a pixel value of a pixel corresponding to the respective light-receiving elements based on the output value.

A second interpolation unit uses a second interpolation algorithm different from the first interpolation algorithm to interpolate a pixel value of a pixel corresponding to the respective light-receiving elements based on the output value.

An image generation unit generates an image based on a pixel value of a pixel corresponding to the respective light-receiving elements, which is interpolated by the first interpolation unit.

A first edge detection unit detects an edge using a first edge detection algorithm based on a pixel value of a pixel corresponding to the respective light-receiving elements, which is interpolated by the second interpolation unit.

Effect of the Invention

As described above, according to the present technology, it is possible to provide an image processing apparatus, an image processing program, and an image processing method that are capable of achieving visibility of the entire image used for capturing a microscopic image and accuracy of image processing at the same time.

MODE(S) FOR CARRYING OUT THE INVENTION

First Embodiment

A microscopic imaging apparatus according to a first embodiment of the present technology will be described.

[Schematic Configuration of Microscopic Imaging Apparatus]

Figure 1:
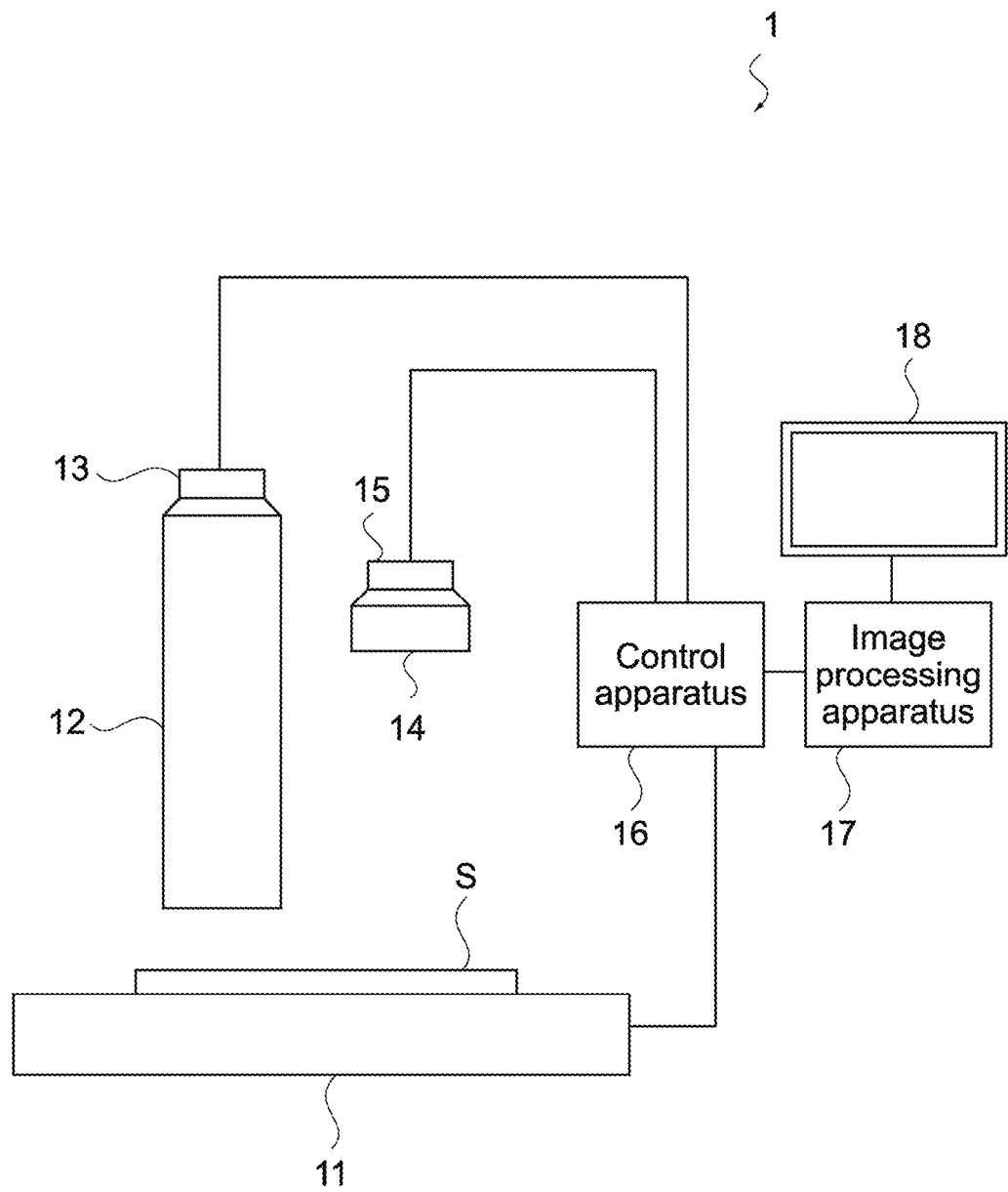
FIG. 1 A schematic diagram showing a schematic configuration of a microscopic imaging apparatus according to a first embodiment of the present technology.

The microscopic imaging apparatus according to this embodiment will be described. FIG. 1 is a schematic diagram showing a schematic configuration of a microscopic imaging apparatus 1. As shown in the figure, the microscopic imaging apparatus 1 includes a stage 11, a microscopic optical system 12, a microscopic image sensor 13, an optical system for the entire image 14, an image sensor for the entire image 15, a control apparatus 16, an image processing apparatus 17, and a display 18. The microscopic image sensor 13, the image sensor for the entire image 15, and the stage 11 are connected to the control apparatus 16, and the control apparatus 16 is connected to the image processing apparatus 17. The display 18 is connected to the image processing apparatus 17, and a sample S is placed on the stage 11. The sample S is, for example, a prepared slide on which a specimen to be observed (e.g., pathological tissue) is fixed.

The stage 11 supports the sample S, and moves the sample S toward the microscopic optical system 12 or the image sensor for the entire image 15 under control by the control apparatus 16. It should be noted that instead of the movement of the stage 11, the microscopic optical system 12 or the optical system for the entire image 14 may be moved with respect to the stage 11.

The microscopic optical system 12 magnifies the image of the sample S, and introduces it into the microscopic image sensor 13. The configuration of the microscopic optical system 12 is not particularly limited. Moreover, the microscopic optical system 12 may be subjected to the control of magnification or the like by the control apparatus 16.

The microscopic image sensor 13 captures a microscopic image of a part of the sample S magnified by the microscopic optical system 12 (hereinafter, microscopic image). The microscopic image sensor 13 transmits the microscopic image to the image processing apparatus 17 via the control apparatus 16. Moreover, the microscopic image sensor 13 is subjected to control of an imaging timing or the like by the control apparatus 16. Although the configuration of the microscopic image sensor 13 is not particularly limited, one having a high resolution is favorable.

The optical system for the entire image 14 introduces the image of the sample S into the image sensor for the entire image 15. The configuration of the optical system for the entire image 14 is not particularly limited.

The image sensor for the entire image 15 captures the entire image of the sample S (hereinafter, entire image) via the optical system for the entire image 14. The image sensor for the entire image 15 is an image sensor including a plurality of light-receiving elements (photoelectric conversion elements) such as a CCD (Charge Coupled Device) image sensor and a CMOS (Complementary Metal Oxide Semiconductor) image sensor.

Figure 2:
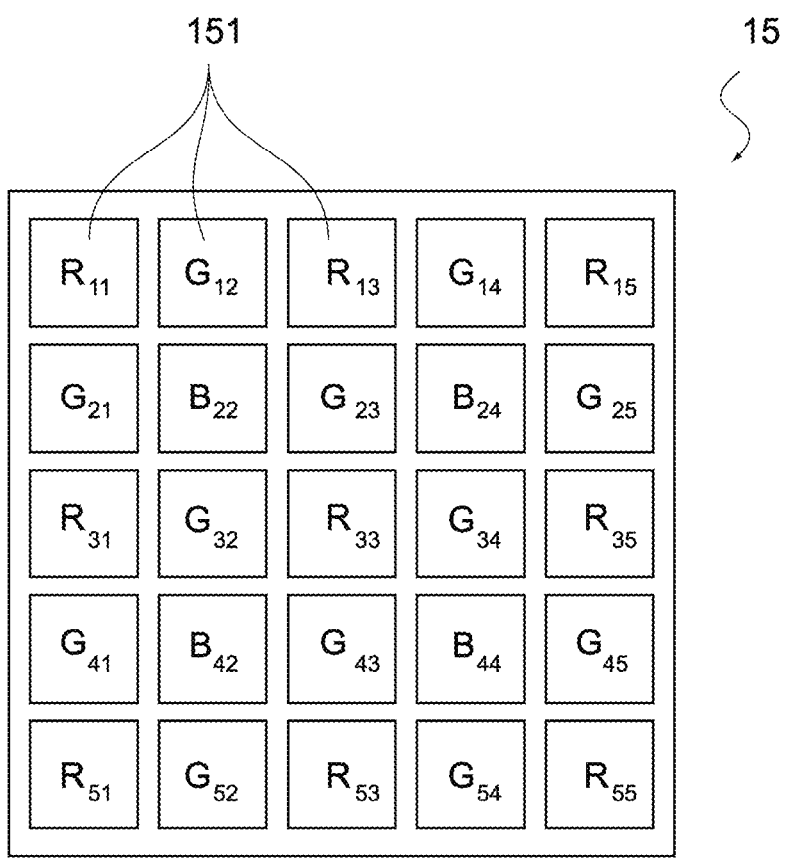
FIG. 2 A schematic diagram showing a configuration of an image sensor for the entire image of the microscopic imaging apparatus.

FIG. 2 is a schematic diagram showing the image sensor for the entire image 15. As shown in the figure, the image sensor for the entire image 15 includes a plurality of light-receiving elements 151 arranged two-dimensionally. It should be noted that the number of light-receiving elements 151 (number of pixels) is actually about several hundred thousands to several millions. The image sensor for the entire image 15 does not need to have a resolution as high as that of the microscopic image sensor 13.

On each light-receiving element 151, a color filter is provided in front of the light-receiving surface. The color filter is a filter that causes light in a specific wavelength to transmit therethrough, and three colors of red (R), blue (B), and green (G) are used generally. As shown in FIG. 2, a color filter of any one of the red (R), blue (B), and green (G) colors is provided to each light-receiving element 151. Specifically, the image sensor for the entire image 15 is a single plate image sensor. The arrangement of the color filters shown in FIG. 2 is arrangement called Bayer arrangement, and a lot of color filters of green (G) are arranged to conform to the light-receiving sensitivity of a human being. It should be noted that the image sensor for the entire image 15 according to this embodiment is not limited to the one having the Bayer arrangement, and may have other arrangement of color filters. The color of the color filters is not limited to the above-mentioned three colors.

In such a structure of the image sensor for the entire image 15, the output value of each light-receiving element 151 is an intensity (shading) of light that has been transmitted through the color filter provided to the light-receiving element 151. For example, the output value of the light-receiving element 151 to which the color filter of red (R) is provided includes no information of blue (B) and green (G). In this case, in the case where an image is generated based on the output value of each light-receiving element 151, the number of pixels is smaller than the number of light-receiving elements 151 (½ or ¼). Therefore, for each light-receiving element 151, interpolation of pixel values (RGB values) is performed using the output values of the light-receiving elements 151 in the vicinity thereof. The interpolation will be described later.

The control apparatus 16 obtains the output of the microscopic image sensor 13 and the image sensor for the entire image 15, and transmits it to the image processing apparatus 17. Moreover, the control apparatus 16 controls the stage 11 and the microscopic image sensor 13 based on information supplied from the image processing apparatus 17 (area detection results, which will be described later).

The image processing apparatus 17 obtains the output of the microscopic image sensor 13 and the image sensor for the entire image 15, and performs generation of an image or image processing. Moreover, the image processing apparatus 17 causes the display 18 to display a microscopic image or the entire image. The detailed configuration of the image processing apparatus 17 will be described later. However, the image processing apparatus 17 may be an information processing apparatus such as a personal computer.

The display 18 displays a microscopic image or the entire image supplied from the image processing apparatus 17. The configuration of the display 18 is not particularly limited.

The microscopic imaging apparatus 1 has the configuration described above. It should be noted that the above-mentioned configuration is only an example, and the microscopic imaging apparatus 1 may have a configuration different from those described here.

[Operation of Microscopic Imaging Apparatus]

The microscopic imaging apparatus 1 operates as follows. First, the image sensor for the entire image 15 captures the entire image of the sample S, and entire image data is generated. The entire image data is transmitted from the image sensor for the entire image 15 to the image processing apparatus 17 via the control apparatus 16.

The image processing apparatus 17 generates the entire image from the entire image data. Moreover, the image processing apparatus 17 performs image processing, which will be described later, on the entire image data, and detects the area in which a specimen to be observed exists in the sample S (hereinafter, specimen existing area). This is because, for example, in the case where the sample S is a specimen fixed on a glass slide, it does not need to observe areas on the glass slide in which the specimen does not exist. Specifically, the specimen existing area is an observation target area in the sample S, which needs to be imaged in a microscope.

Moreover, in the case where information such as a character and a code (barcode or the like) (hereinafter, display information) is displayed on the sample S, the image processing apparatus 17 recognizes the information from the entire image data. It should be noted that the character or the code is a specimen number, which is described in or attached to the sample S by a user (observer, specimen collector, etc.), for example. The image processing apparatus 17 supplies the detected specimen existing area to the control apparatus 16.

The control apparatus 16 controls the stage 11, the microscopic optical system 12, and the microscopic image sensor 13 based on the specimen existing area supplied from the image processing apparatus 17, and causes the microscopic image sensor 13 to image the specimen existing area at a predetermined magnification. Because the visual field range is fine because of the microscopic optical system 12, the microscopic image sensor 13 divides the specimen existing area into a plurality of areas and captures an image of each area. The microscopic image sensor 13 transmits a plurality of pieces of microscopic image data generated by the imaging to the image processing apparatus 17 via the control apparatus 16.

The image processing apparatus 17 bonds the plurality of pieces of microscopic image data together (stitching). Accordingly, a microscopic image of the specimen existing area is generated. The image processing apparatus 17 associates the entire image with the microscopic image. Moreover, if there is the display information read from the entire image, the image processing apparatus 17 associates the information with the images and store them.

When a user views the image of the sample, the image processing apparatus 17 can cause the display 18 to display the entire image as a list image (thumbnail image), and can cause each entire image to additionally display the display information. When the user refers to the list image or display information to select a desired sample, the image processing apparatus 17 can cause the display 18 to display the microscopic image associated with the selected sample.

As described above, in the microscopic imaging apparatus 1, the entire image data of the sample S imaged by the image sensor for the entire image 15 is used to detect the imaging area of the microscopic image sensor 13 (i.e., specimen existing area) or to recognize the display information. Moreover, the entire image generated from the entire image data is used also as a list image for a user to search for a desired microscopic image.

Here, the resolution of the image sensor for the entire image 15 is generally low, and problems of accuracy of extracting the specimen existing area or recognizing the display information occur. If the resolution of the image sensor for the entire image 15 is improved, these processes take a time, which is not favorable. In particular, in the field of pathological diagnosis, for example, an enormous amount of samples S needs to be observed by a microscope in many cases and the imaging process is desired to be performed at higher speed. In the microscopic imaging apparatus 1 according to this embodiment, accuracy of detecting the specimen existing area and of recognizing the display information is improved and it is possible to reduce the time that is needed to perform these processes, with the configuration of the image processing apparatus 17, which will be described next.

[Functional Configuration of Image Processing Apparatus]

Figure 3:
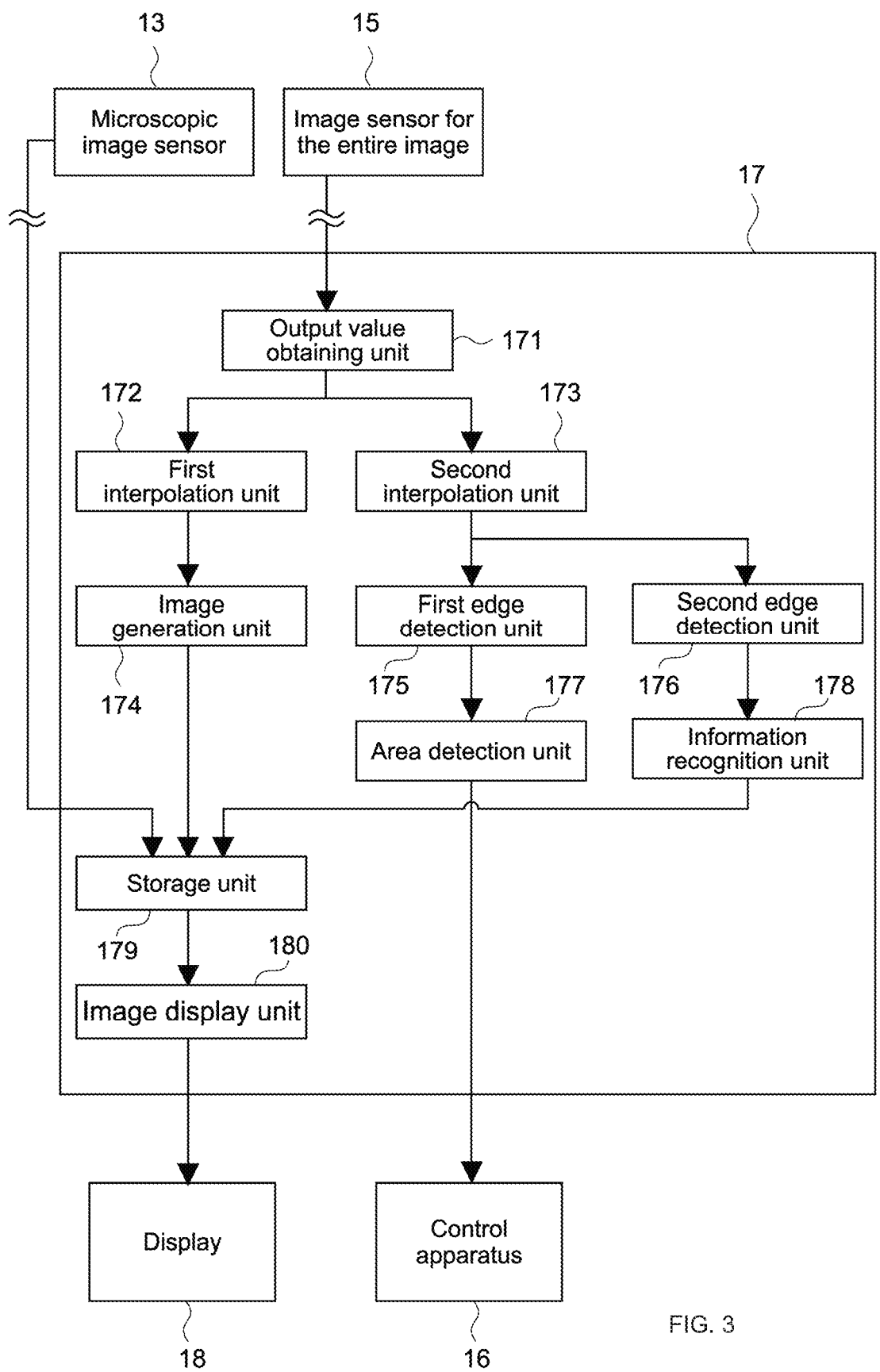
FIG. 3 A block showing a functional configuration of the image processing apparatus of the microscopic apparatus.

The functional configuration of the image processing apparatus 17 will be described. FIG. 3 is a block diagram showing the functional configuration of the image processing apparatus 17. As shown in the figure, the image processing apparatus 17 includes an output value obtaining unit 171, a first interpolation unit 172, a second interpolation unit 173, an image generation unit 174, a first edge detection unit 175, a second edge detection unit 176, an area detection unit 177, an information recognition unit 178, a storage unit 179, and an image display unit 180.

Such a functional configuration of the image processing apparatus 17 is achieved by the cooperation between hardware such as CPU (Central Processing Unit) and memory and software. Moreover, these configurations do not necessarily need to be achieved by one device, may be achieved by a plurality of devices, and may be achieved via a computer network or on a computer network.

The output value obtaining unit 171 obtains the output value of each light-receiving element 151 from the image sensor for the entire image 15 via the control apparatus 16 (an illustration omitted). As described above, the color filter of each color (R, G, or B) is provided to each light-receiving element 151, and the output value of each light-receiving element 151 is an intensity (shading) of light of a specific color, which has been transmitted through the color filter. Hereinafter, the output value of each color obtained by the output value obtaining unit 171 from each light-receiving element 151 is represented by a sign ($R_{11}$ or the like) in FIG. 2. The output value obtaining unit 171 supplies the obtained output value of each light-receiving element 151 to the first interpolation unit 172 and the second interpolation unit 173.

The first interpolation unit 172 and the second interpolation unit 173 generate (interpolate) a pixel value of the pixel corresponding to the respective light-receiving elements 151 based on the output value of each light-receiving elements 151 supplied from the output value obtaining unit 171.

Figure 4A:
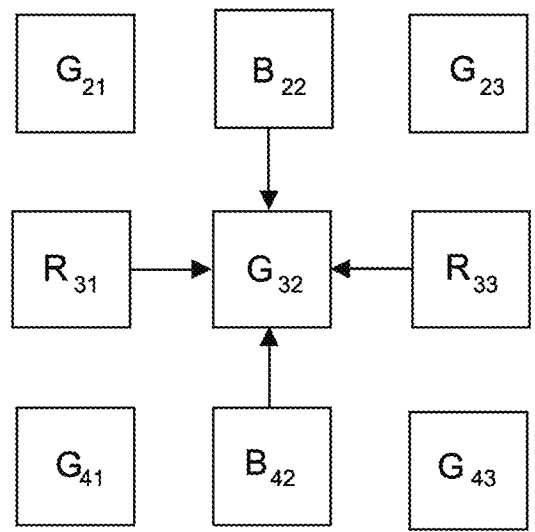
FIGS. 4A and 4B A schematic showing interpolation of pixel values performed by the image processing apparatus of the microscopic apparatus.
Figure 4B:
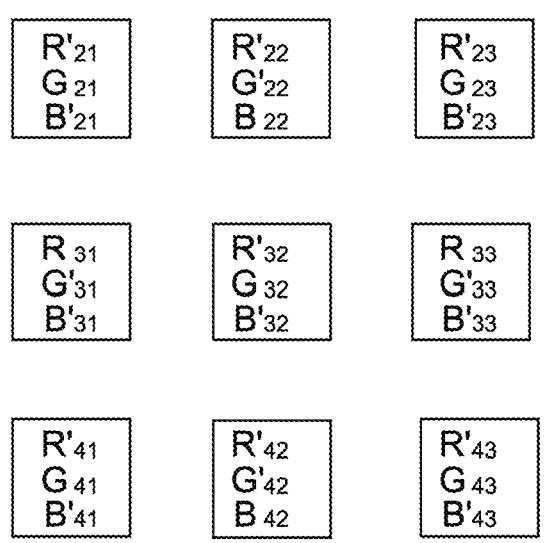

FIGS. 4A and 4B are schematic diagrams showing interpolation of the pixel value. FIG. 4A shows the output value ($G_{32}$ or the like) output from each light-receiving element 151. As shown in the figure, the output value of the central pixel is a value of a green color (output value of the light-receiving element 151 to which the color filter of a green color is provided), and the output values of the surrounding (top, bottom, right, and left) light-receiving elements 151 are values of red (R) or blue (B).

Therefore, as shown in FIG. 4B, the central pixel can give the output value of green component (G), and can interpolate a red component (R') and a blue component (B') using the output value of the surrounding pixel. Such interpolation of the pixel value is referred to as "demosaic." Hereinafter, regarding each light-receiving element 151, the component of each color (RGB value) interpolated using the output value thereof and the output values of the surrounding light-receiving elements is assumed to be the output value of the pixel corresponding to the light-receiving element 151. It should be noted that the method of generating a pixel value shown here does not represent a specific interpolation algorithm.

The first interpolation unit 172 uses a first interpolation algorithm to generate the pixel value of the pixel corresponding to the respective light-receiving elements 151 from the output value of each light-receiving element 151. Here, the first interpolation algorithm may be an interpolation algorithm that interpolates a pixel value so that the difference between pixel values of pixels corresponding to adjacent light-receiving elements 151 is small. Examples of such an interpolation algorithm include "linear interpolation method," specifically.

The linear interpolation method is an interpolation algorithm that interpolates a pixel value of a pixel to be interpolated with the average value of output values of surrounding pixels. In the linear interpolation method, the output value of each pixel is smoothed, and the difference between pixel values is small as compared with a second interpolation algorithm to be described later. In the case of an algorithm in which the difference between the output value of the pixel and the output values of adjacent pixels is small, the image does not extremely change as compared with the original image even if the pixel is thinned out or averaged when the image is scaled down and displayed, for example.

It should be noted that the first interpolation algorithm is not limited to the linear interpolation method and may be another interpolation algorithm in which the difference between pixel values is small as compared with the second interpolation algorithm to be described later. Moreover, the first interpolation algorithm may be a "curved surface fitting method" in which the deviation of a color caused by interpolation of a pixel value called a false color can be suppressed, for example. The first interpolation unit 172 supplies the interpolated pixel value of the pixel corresponding to the respective light-receiving elements 151 to the image generation unit 174.

The second interpolation unit 173 uses the second interpolation algorithm to generate a pixel value of the pixel corresponding to the respective light-receiving elements 151 from the output value of each light-receiving element 151. Here, the second interpolation algorithm is an interpolation algorithm different from the first interpolation algorithm. In particular, the second interpolation algorithm is favorably an interpolation algorithm that interpolates a pixel value so that the difference between pixel values of the pixels corresponding to adjacent light-receiving elements 151 is large as compared with the first interpolation algorithm. Examples of such an interpolation algorithm include a "gradient method," specifically.

The gradient method is an interpolation algorithm in which the green component of each pixel is obtained along the direction having the strong continuity, and after that, the component of another color is compared with the obtained green component. In the gradient method, the difference between pixel values is large as compared with the linear interpolation method (the first interpolation algorithm) in which the component of each color is simply averaged.

It should be noted that the second interpolation algorithm is not limited to the gradient method, and may be another interpolation algorithm in which the difference between the pixel values is large as compared with the first interpolation algorithm. For example, an advanced color plane interpolation method (ACPI method) to be described in a second embodiment may be used as the second interpolation algorithm. The second interpolation unit 173 supplies the interpolated pixel value of the pixel corresponding to the respective light-receiving elements 151 to the first edge detection unit 175 and the second edge detection unit 176.

Moreover, the second interpolation unit 173 can perform YUV conversion of a pixel value as well as interpolation of a pixel value using the second interpolation algorithm. As will be described later, the pixel value generated by the second interpolation unit 173 is not used for generating an image, and is used for edge detection. Therefore, the pixel value is favorably not in the RGB format but in the YUV (Y=brightness, U=difference between brightness and blue component, and V=difference between brightness and red component) format.

Here, performing YUV conversion "as well as" interpolation of a pixel value represents that generation of a pixel value and the YUV conversion are performed in parallel so that after a pixel value (RGB value) of a pixel corresponding to one light-receiving element 151 is generated, the YUV conversion is performed on the pixel value and a pixel value of the pixel corresponding to the next light-receiving element 151. The second interpolation unit 173 performs the interpolation of a pixel value and the YUV conversion as described above, thereby reducing the processing time as compared with the case where after pixel values of all of the light-receiving elements 151 are generated, the YUV conversion is performed on each pixel value.

The image generation unit 174 generates an image (entire image) based on the pixel value of the pixel corresponding to the light-receiving element 151, which is generated by the first interpolation unit 172. As described above, the first interpolation unit 172 uses the first interpolation algorithm that interpolates a pixel value so that the difference between pixel values of pixels corresponding to adjacent to the light-receiving elements 151 is small. Therefore, the generated image is an image having an excellent visibility in which the pixel value changes smoothly. As described above, the image sensor for the entire image 15 often has a low resolution. In this case, the visibility of an image is important particularly. The image generation unit 174 stores the generated entire image in the storage unit 179.

The first edge detection unit 175 detects an edge based on the pixel value of the pixel corresponding to the respective light-receiving elements, which is generated by the second interpolation unit 173. The edge is a boundary in which the difference between pixel values of adjacent pixels or pixels in a certain range. The first edge detection unit 175 can detect the edge using a first edge detection algorithm. The first edge detection algorithm is not particularly limited, and is favorably an edge detection algorithm that causes the area detection unit 177 to be described later to detect an area easily.

Here, the second interpolation unit 173 uses the second interpolation algorithm that interpolates a pixel value so that the difference between pixel values of the pixels corresponding to the adjacent light-receiving elements 151 is large. Because the edge can be easily detected if the difference between pixel values is large, the first edge detection unit 175 can detect the edge with high detection accuracy. The first edge detection unit 175 supplies the edge detection results to the area detection unit 177.

The second edge detection unit 176 detects an edge based on the pixel value of the pixel corresponding to the respective light-receiving elements 151, which is generated by the second interpolation unit 173. The second edge detection unit 176 can use a second edge detection algorithm, which is different from the above-mentioned first edge detection algorithm, to detect the edge. The second edge detection algorithm is not particularly limited, and is favorably a detection algorithm that causes the information recognition unit 178 to be described later to recognize information easily.

Here, the second interpolation unit 173 uses the second interpolation algorithm that interpolates a pixel value so that the difference between pixel values of the pixels corresponding to the adjacent light-receiving elements 151 is large. The second edge detection unit 176 can detect the edge with high detection accuracy. The second edge detection unit 176 supplies the edge detection results to the information recognition unit 178.

The area detection unit 177 detects an area based on the edge detection results obtained from the first edge detection unit 175. The area detection is processing of detecting an area in which a specimen being an observation target exists in the above-mentioned sample S (specimen existing area). The area detection unit 177 can regard the area in which the edge detected in the first edge detection unit 175 exists as the specimen existing area. Because areas in which no specimen exists generally include no edge (e.g., glass slide) in the sample S, it is possible to determine the presence/absence of the specimen with the presence/absence of the edge.

Here, because the first edge detection unit 175 detects the edge with high accuracy based on the pixel value generated by using the second interpolation algorithm as described above, the area detection using the edge also can be performed with high accuracy by the area detection unit 177. The area detection unit 177 supplies the detected specimen existing area to the control apparatus 16.

The information recognition unit 178 recognizes information based on the edge detection results obtained from the second edge detection unit 176. In the information recognition, the display information displayed in the sample S such as a character and a code (barcode or the like) is detected and recognized as information. The information recognition unit 178 can perform processing such as outline extraction from the edge detected in the second edge detection unit 176, and recognize it as information.

Here, because the second edge detection unit 176 detects the edge with high accuracy based on the pixel value generated by using the second interpolation algorithm as described above, the information recognition using the edge also can be performed with high accuracy by the information recognition unit 178. The information recognition unit 178 supplies the information recognition results to the storage unit 179, and causes the storage unit 179 to associates the results with the entire image and to store them.

The storage unit 179 stores the entire image supplied from the image generation unit 174, the information supplied from the information recognition unit 178, the microscopic image captured by the microscopic image sensor 13, and the like, as described above.

The image display unit 180 causes the display 18 to display an image. The image display unit 180 can cause the display 18 to display the above-mentioned entire image, the microscopic image, the information associated with them, or the like by an arbitrary interface.

[Operation of Image Processing Apparatus]

Figure 5:
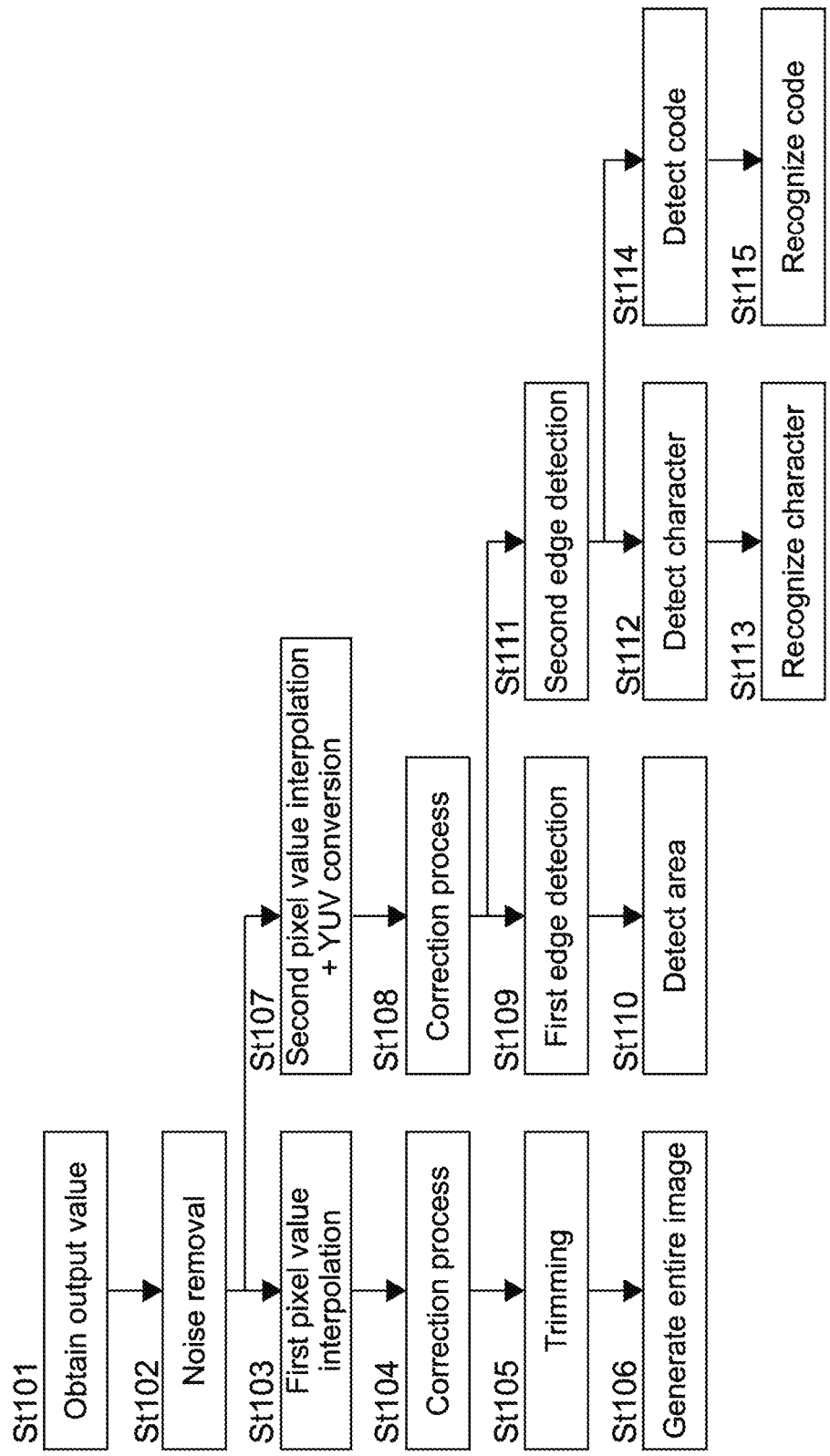
FIG. 5 A schematic showing an operation of the image processing apparatus of the microscopic apparatus.

The operation of the image processing apparatus 17 having the configuration described above will be described. FIG. 5 is an image processing flow showing the operation of the image processing apparatus 17.

First, the output value obtaining unit 171 obtains the output value of each light-receiving element 151 (St101). The output value obtaining unit 171 may perform noise removal on the obtained output value (St102). The noise removal is processing for removing physical noise or electrical noise of the output value, and can be performed using various well-known techniques. The output value obtaining unit 171 supplies the output value of each light-receiving element 151 to the first interpolation unit 172 and the second interpolation unit 173.

The first interpolation unit 172 uses the supplied output value of each light-receiving element 151 to interpolate a pixel value with the first interpolation algorithm (linear interpolation method or the like) as described above (St103).

Next, the image generation unit 174 performs an correction process on the pixel values interpolated by the first interpolation unit 172 (St104). The correction process includes various correction processes such as calibration with sRGB (international standard of color space by IEC (International Electrotechnical Commission)), white balance adjustment, and gamma correction. As the correction process, an appropriate process only needs to be performed as necessary.

Next, the image generation unit 174 performs trimming on the image on which the above-mentioned correction process is performed (St105). In the trimming, areas in the visual field range of the image sensor for the entire image 15 other than the sample S are removed. The trimming can be performed by using a pixel value range (color range) or the like.

Next, the image generation unit 174 generates an image (entire image) based on the pixel value on which the correction process or the trimming is performed (St106). Because the pixel value is interpolated using the first interpolation algorithm that is suitable for generating an image by the first interpolation unit 172 as described above (St103), the entire image generated by the image generation unit 174 has an excellent visibility.

The second interpolation unit 173 uses the supplied output value of each light-receiving element 151 to interpolate a pixel value with the second interpolation algorithm (gradient method or the like) as described above (St107). Moreover, the second interpolation unit 173 can perform the YUV conversion of the pixel value as well as the interpolation of the pixel value.

Next, the second interpolation unit 173 performs the correction process on the pixel value of each light-receiving element 151 (St108). The correction process includes various correction processes such as gamma correction. As the correction process, an appropriate process only needs to be performed as necessary.

Next, the first edge detection unit 175 uses the first edge detection algorithm to perform edge detection on the pixel on which the above-mentioned correction process is performed (St109).

Next, the area detection unit 177 performs an area detection process on the edge detection results obtained from the first edge detection unit 175, and detects the specimen existing area (St110). Because the pixel value is interpolated using the second interpolation algorithm suitable for the edge detection by the second interpolation unit 173 as described above (St207), the area detection unit 177 can detect an area with high accuracy.

The second edge detection unit 176 uses the second edge detection algorithm to perform the edge detection on the pixel on which the above-mentioned correction process is performed (St111).

Next, the information recognition unit 178 performs a character detection process on the edge detection results obtained from the second edge detection unit 176, and detects a character (St112). The information recognition unit 178 recognizes the detected character (St113), and obtains character information. Moreover, the information recognition unit 178 performs a code detection process on the edge detection results obtained from the second edge detection unit 176, and detects a code (st114). The information recognition unit 178 recognizes the detected code (St115), and obtains code information.

Because the pixel value is interpolated using the second interpolation algorithm suitable for the edge detection by the second interpolation unit 173 as described above (St107), the information recognition unit 178 can recognize the character information and code information with high accuracy.

As described above, in the image processing apparatus 17 according to this embodiment, the first interpolation unit 172 uses the first interpolation algorithm suitable for generating an image to interpolate a pixel value, and the second interpolation unit 173 uses the second interpolation algorithm suitable for the edge detection to interpolate a pixel value. Therefore, the image generation unit 174 can generate the entire image having a high visibility, and the area detection unit 177 and the information recognition unit 178 can detect an area and recognize information with high accuracy.

Comparison with Comparative Example

Figure 6:
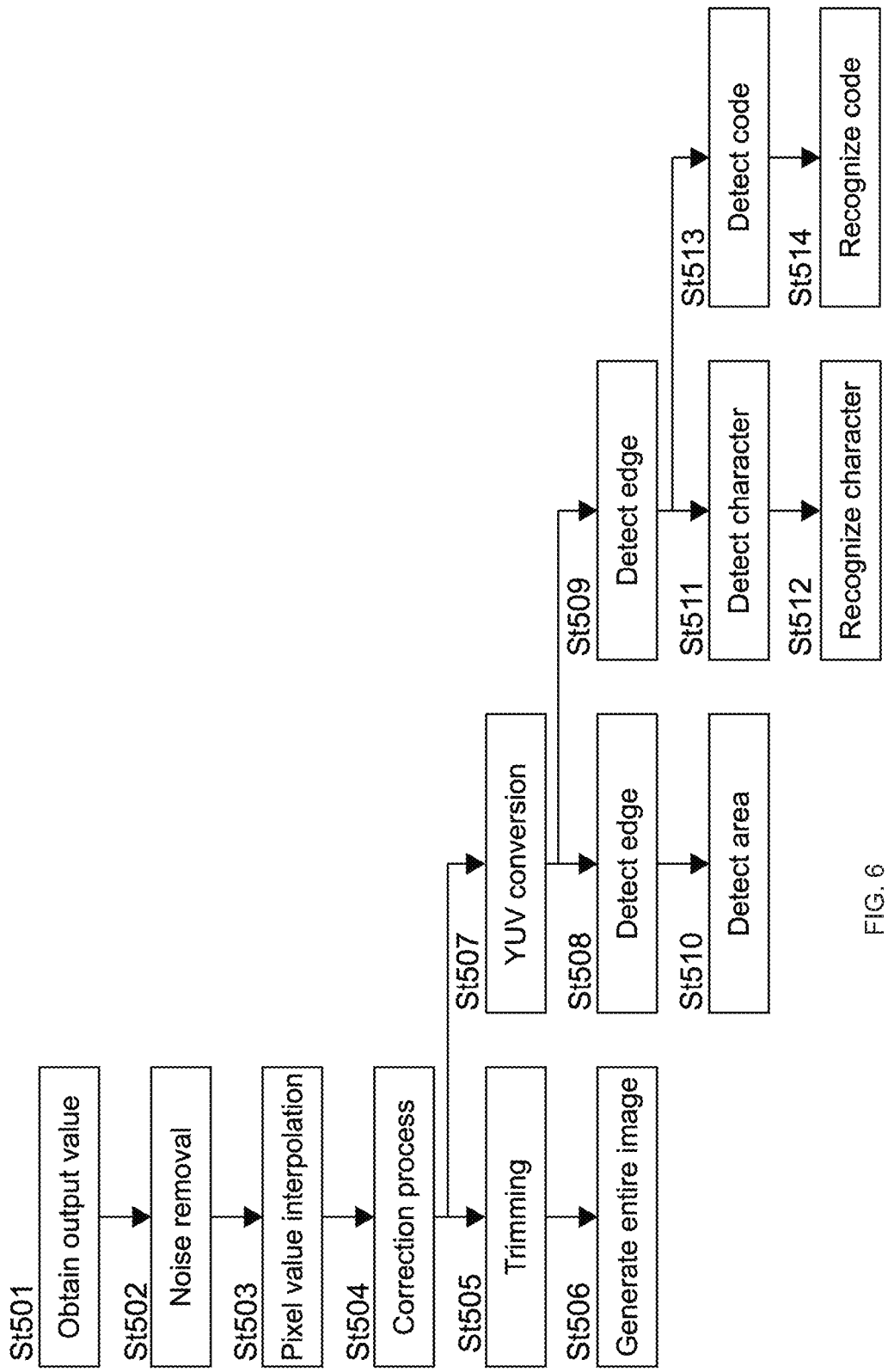
FIG. 6 A schematic diagram showing an operation of an image processing apparatus of a microscopic apparatus according to a comparative example.

The image processing flow performed in a general microscopic imaging apparatus is shown in FIG. 6 as a comparative example.

As shown in the figure, in a general microscopic imaging apparatus, when the output value of the image sensor for the entire image is obtained (St501), noise removal (St502), pixel value interpolation (St503), and a correction process (St504) are performed on the output value.

On the pixel after the correction process, trimming (St505) and generation of the entire image (St506) are performed. Moreover, on the pixel after the above-mentioned correction process, the YUV conversion of a pixel value (RGB value) (St507) is performed, and edge detection for detecting an area (St508) and edge detection for recognizing information (St509) are performed. Area detection of the specimen existing area (St510) is performed on the edge detection results for detecting an area, and character detection (St511), character recognition (St512), code detection (St513), and code recognition (St514) are performed on the edge detection results for recognizing information.

As described above, in a general microscopic imaging apparatus, the interpolation results of one pixel value interpolation process (St503) are used for generation of the entire image (St506), the area detection (St510), and the information recognition (St511 to St514). Therefore, in the pixel value interpolation process, if an interpolation algorithm suitable for generating an image having a high visibility is used, an edge is hard to detect, and accuracy of area detection and information recognition is lowered. On the other hand, if an interpolation algorithm suitable for edge detection is used, the entire image having a strong edge and a low visibility is generated. Specifically, in the comparative example, the visibility of the entire image is in a relationship of trade-off with the accuracy of edge detection, and it has been difficult to improve them at the same time.

On the other hand, in the image processing apparatus 17 according to this embodiment, an interpolation algorithm for generating the entire image (first interpolation algorithm) and an interpolation algorithm for edge detection (second interpolation algorithm) are used. Therefore, by using the optimal interpolation algorithm, the visibility of the entire image and the accuracy of the edge detection can be improved at the same time.

Second Embodiment

The microscopic imaging apparatus according to the second embodiment of the present technology will be described. It should be noted that in the microscopic imaging apparatus according to this embodiment, because the configuration other than the image processing apparatus is the same as that in the first embodiment, it will be denoted by the same reference symbols and a description thereof will be omitted.

[Functional Configuration of Image Processing Apparatus]

Figure 7:
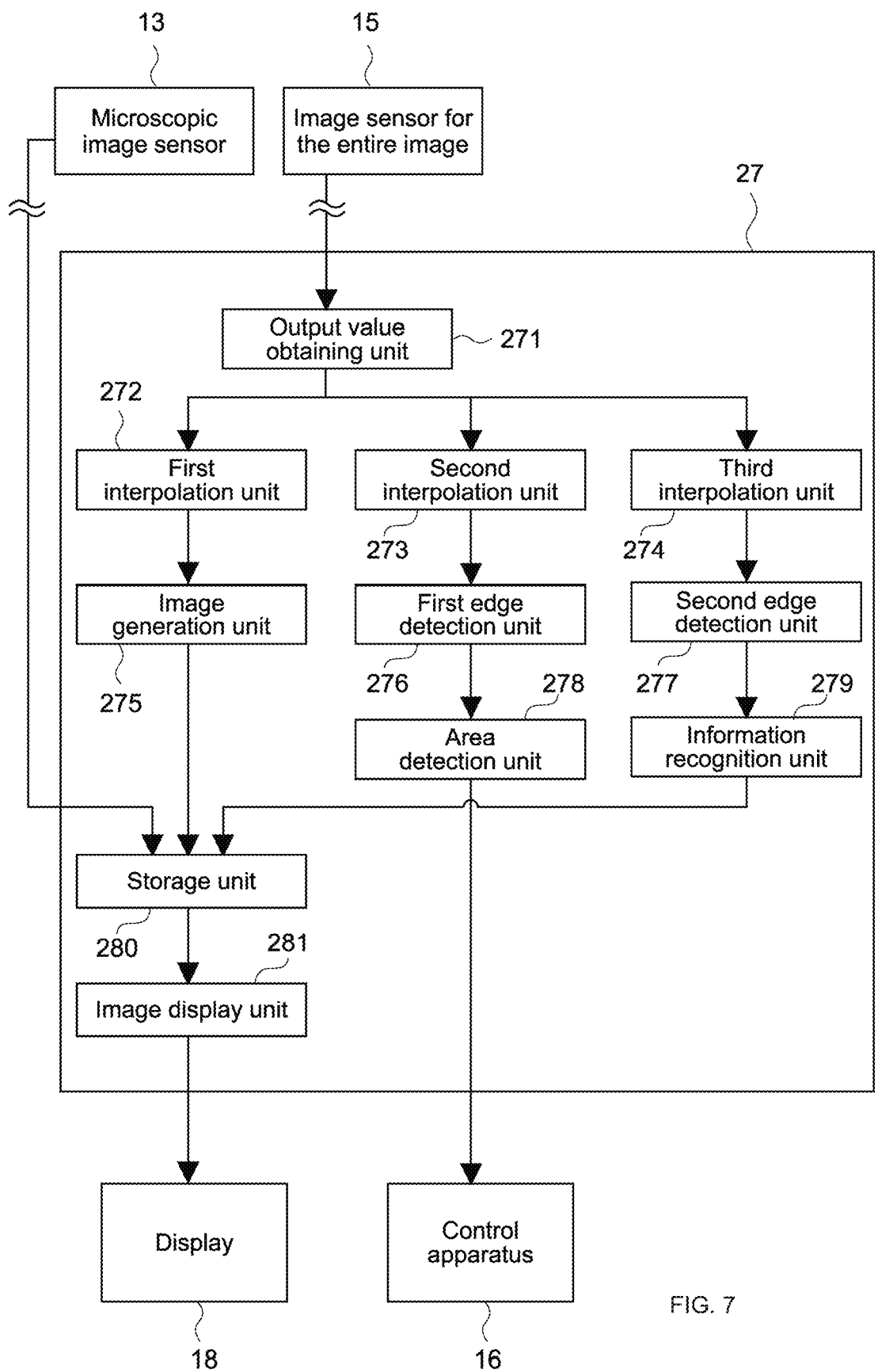
FIG. 7 A block showing a functional configuration of an image processing apparatus of a microscopic imaging apparatus according to a second embodiment of the present technology.

The functional configuration of an image processing apparatus 27 will be described. FIG. 7 is a block diagram showing the functional configuration of the image processing apparatus 27. As shown in the figure, the image processing apparatus 27 includes an output value obtaining unit 271, a first interpolation unit 272, a second interpolation unit 273, a third interpolation unit 274, an image generation unit 275, a first edge detection unit 276, a second edge detection unit 277, an area detection unit 278, an information recognition unit 279, a storage unit 280, and an image display unit 281.

Such a functional configuration of the image processing apparatus 27 can be achieved by the cooperation between hardware such as a CPU and memory and software. Moreover, these configurations do not necessarily need to be achieved by one device, may be achieved by a plurality of devices, and may be achieved via a computer network or on a computer network.

The output value obtaining unit 271 obtains the output value of each light-receiving element 151 from the image sensor for the entire image 15. As described above, the color filter of each color (R, G, or B) is provided to each light-receiving element 151, and the output value of each light-receiving element 151 is an intensity (shading) of light of the specific color, which has been transmitted through the color filter.

The first interpolation unit 272 uses the first interpolation algorithm to generate a pixel value of the pixel corresponding to the respective light-receiving elements 151 from the output value of each light-receiving element 151. Here, the first interpolation algorithm may be an interpolation algorithm that interpolates a pixel value so that the difference between pixel values of the pixels corresponding to the adjacent light-receiving elements 151 is small. Examples of such an interpolation algorithm include the linear interpolation method described in the first embodiment, specifically.

It should be noted that the first interpolation algorithm is not limited to the linear interpolation method, and may be another interpolation algorithm in which the difference between pixel values is small as compared with a second interpolation algorithm and a third interpolation algorithm to be described later. Moreover, the first interpolation algorithm may be the curved surface fitting method, for example. The first interpolation unit 272 supplies the interpolated pixel value of the pixel corresponding to the respective light-receiving elements 151 to the image generation unit 275.

The second interpolation unit 273 uses the second interpolation algorithm to generate a pixel value of the pixel corresponding to the respective light-receiving elements 151 from the output value of each light-receiving element 151. Here, the second interpolation algorithm is an interpolation algorithm different from the first interpolation algorithm. In particular, an interpolation algorithm that interpolates a pixel value so that the difference between pixel values of the pixels corresponding to the adjacent light-receiving elements 151 is large as compared with the first interpolation algorithm is favorable. Examples of such an interpolation algorithm include the gradient method described in the first embodiment, specifically.

It should be noted that the second interpolation algorithm is not limited to the gradient method, and may be another interpolation algorithm in which the difference between pixel values is large as compared with the first interpolation algorithm. The second interpolation unit 273 supplies the interpolated pixel value of the pixel corresponding to the respective light-receiving elements 151 to the first edge detection unit 276. Moreover, the second interpolation unit 273 can use the second interpolation algorithm to interpolate a pixel value and to perform the YUV conversion of a pixel value similarly to the first embodiment.

The third interpolation unit 274 uses the third interpolation algorithm to generate the pixel value of the pixel corresponding to the respective light-receiving elements 151 from the output value of each light-receiving element 151. Here, the third interpolation algorithm is an interpolation algorithm different from the first interpolation algorithm and the second interpolation algorithm. In particular, an interpolation algorithm that interpolates a pixel value so that the difference between the pixel values of the pixels corresponding to the adjacent light-receiving elements 151 is large as compared with the first interpolation algorithm is favorable. Examples of such an interpolation algorithm include the "advanced color plane interpolation method (ACPI method)", specifically.

The ACPI method is an interpolation algorithm that can obtain a sharp image by adding a high frequency component to the linear interpolation values of the surrounding pixels of the pixel to be interpolated as compared with the existing method. Because the linear interpolation has effects of smoothing, the high frequency component cannot be restored. In view of the above, the image is made sharp by using the output values of the surrounding pixels of the pixel to be interpolated to estimate the high frequency component, and adding it to the linear interpolation. In the ACPI method, the difference between pixel values is large as compared with the linear interpolation method (the first interpolation algorithm) in which each color component is averaged simply.

It should be noted that the third interpolation algorithm is not limited to the ACPI method, and may be another interpolation algorithm in which the difference between pixel values is large as compared with the first interpolation algorithm. The third interpolation unit 274 supplies the interpolated pixel value of the pixel corresponding toe each light-receiving element 151 to the second edge detection unit 277. Moreover, the third interpolation unit 274 can perform the YUV conversion of a pixel value as well as interpolation of a pixel value using the third interpolation algorithm similarly to the second interpolation unit 273.

The image generation unit 275 generates the entire image based on the pixel value of the pixel corresponding to the respective light-receiving elements 151, which is generated by the first interpolation unit 272. Because the first interpolation unit 272 uses the first interpolation algorithm that interpolates a pixel value so that the difference between the pixel values of the pixels corresponding to the light-receiving elements 151 is small as described above, the generated image has an excellent visibility in which the pixel value changes smoothly. The image generation unit 275 stores the generated entire image in the storage unit 280.

The first edge detection unit 276 detects edge based on the pixel value of the pixel corresponding to the respective light-receiving elements 151, which is generated by the second interpolation unit 273. The edge is a boundary in which the difference between pixel values of adjacent pixels or pixels in a certain range is large, and the first edge detection unit 276 can use the first edge detection algorithm to detect the edge. The first edge detection algorithm is not particularly limited, and is favorably an edge detection algorithm that causes the area detection unit 278 to be described later to detect an area easily.

Here, the second interpolation unit 273 uses the second interpolation algorithm that interpolates a pixel value so that the difference between pixel values of the pixels corresponding to the adjacent light-receiving elements 151 is large. Because the edge can be easily detected if the difference between pixel values is large, the first edge detection unit 276 can detect the edge with high accuracy. The first edge detection unit 276 supplies the edge detection results to the area detection unit 278.

The second edge detection unit 277 detects the edge based on the pixel value of the pixel corresponding to the respective light-receiving elements 151, which is generated by the third interpolation unit 274. The second edge detection unit 277 can use the second edge detection algorithm that is different from the above-mentioned first edge detection algorithm to detect the edge. The second edge detection algorithm is not particularly limited, and is favorably a detection algorithm that causes the information recognition unit 279 to be described later to recognize information.

Here, the third interpolation unit 274 uses the third interpolation algorithm that interpolates a pixel value so that the difference between the pixel values of the pixels corresponding to the adjacent light-receiving elements 151 is large. Because the edge can be easily detected if the difference between pixel values is large, the second edge detection unit 277 can detect the edge with high accuracy. The second edge detection unit 277 supplies the edge detection results to the information recognition unit 279.

The area detection unit 278 detects an area based on the edge detection results obtained from the first edge detection unit 276. The area detection is a process of detecting the area in which the specimen being an observation target exists in the above-mentioned sample S (specimen existing area). The area detection unit 278 can regard the area in which the edge detected in the first edge detection unit 276 exists as the specimen existing area.

Here, because the first edge detection unit 276 detects the edge with high accuracy based on the pixel value generated using the second interpolation algorithm as described above, the area detection using the edge can by performed with high accuracy by the area detection unit 278. The area detection unit 278 supplies the area detection results to the control apparatus 16.

The information recognition unit 279 recognizes information based on the edge detection results obtained from the second edge detection unit 277. In the information recognition, the display information such as character information and code information (barcode information) displayed in the sample S is detected, and is recognized as information. The information recognition unit 279 can perform processing such as outline extraction from the edge detected in the second edge detection unit 277, and recognize it as information.

Here, because the second edge detection unit 277 detects the edge with high accuracy based on the pixel value generated using the second interpolation algorithm as described above, the information recognition using the edge can by performed with high accuracy by the information recognition unit 279. The information recognition unit 279 supplies the information recognition results to the storage unit 280, and causes the storage unit 280 to associate it with the entire image and store it.

The storage unit 280 stores the entire image supplied from the image generation unit 275, the information supplied from the information recognition unit 279, the microscopic image captured by the microscopic image sensor 13, and the like.

The display unit 281 causes the display 18 to display an image. The display unit 281 can cause the display 18 to display the above-mentioned entire image, the microscopic image, information associated therewith, and the like by an arbitrary interface.

[Operation of Image Processing Apparatus]

Figure 8:
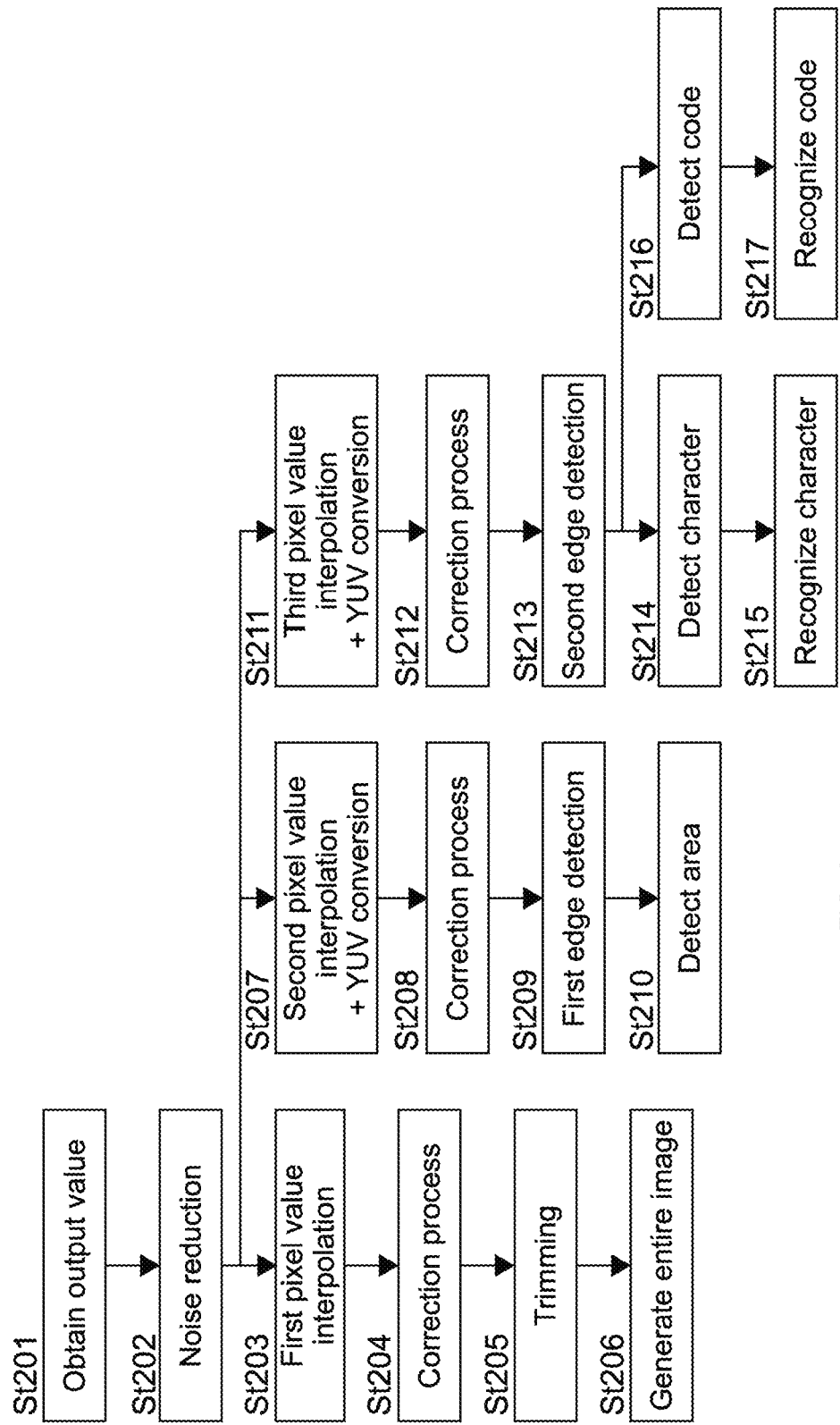
FIG. 8 A schematic diagram showing an operation of the image processing apparatus of the microscopic apparatus.

The operation of the image processing apparatus 27 having the above-mentioned configuration will be described. FIG. 8 is an image processing flow showing the operation of the image processing apparatus 27.

First, the output value obtaining unit 271 obtains the output value of each light-receiving element 151 (St201). The output value obtaining unit 271 may perform noise reduction on the obtained output value (St202). The noise reduction is a process for removing the physical noise or electrical noise of the output value, and may be performed using various well-known techniques. The output value obtaining unit 271 supplies the output value of each light-receiving element 151 to the first interpolation unit 272, the second interpolation unit 273, and the third interpolation unit 274.

The first interpolation unit 272 uses the supplied output value of each light-receiving element 151 to interpolate a pixel value with the first interpolation algorithm (linear interpolation method or the like) as described above (St203).

Next, the image generation unit 275 performs a correction process on the output value interpolated by the first interpolation unit 272 (St204). The correction process includes various correction processes such as calibration with sRGB, white balance adjustment, and gamma correction. As the correction process, an appropriate process only needs to be performed as necessary.

Next, the image generation unit 275 performs the trimming on the pixel on which the above-mentioned correction process is performed (St205). In the trimming, areas in the visual filed range of the image sensor for the entire image 15 other than the sample S are removed. The trimming can be performed by using a pixel value range (color range) or the like.

Next, the image generation unit 275 generates an image (entire image) based on the pixel on which the correction process or trimming is performed (St206). Because the pixel value is interpolated using the first interpolation algorithm suitable for generating an image by the first interpolation unit 272 as described above (St203), the entire image generated by the image generation unit 275 has an excellent visibility.

The second interpolation unit 273 uses the supplied output value of each light-receiving element 151 to interpolate a pixel value with the second interpolation algorithm (gradient method or the like) as described above (St207). Moreover, the second interpolation unit 273 can perform the YUV conversion of a pixel value as well as the interpolation of a pixel value.

Next, the second interpolation unit 273 performs the correction process on the pixel value of each light-receiving element 151 (St208). The correction process includes various correction processes such as gamma correction. As the correction process, an appropriate process may be performed as necessary.

Next, the first edge detection unit 276 uses the first edge detection algorithm to perform edge detection on the pixel on which the above-mentioned correction process is performed (St209).

Next, the area detection unit 278 performs the area detection process on the edge detection results obtained from the first edge detection unit 276 to detect the specimen existing area (St210). Because the pixel value is interpolated by using the second interpolation algorithm suitable for edge detection by the second interpolation unit 273 as described above (St207), the area detection unit 278 can detect an area with high accuracy.

The third interpolation unit 274 uses the supplied output value of each light-receiving element 151 to interpolate a pixel value with the third interpolation algorithm (ACPI method or the like) as described above (St211). Moreover, the third interpolation unit 274 can perform the YUV conversion of a pixel value as well as the interpolation of a pixel value.

Next, the third interpolation unit 274 performs the correction process on the pixel value of each light-receiving element 151 (St212). The correction process includes various correction processes such as gamma correction. As the correction process, an appropriate process only needs to be performed as necessary.

Next, the second edge detection unit 277 uses the second edge detection algorithm to perform edge detection on the pixel on which the above-mentioned correction process is performed (St213).

Next, the information recognition unit 279 performs the character detection process on the edge detection results obtained from the second edge detection unit 277 to detect a character (St214). The information recognition unit 178 recognizes the detected character (St215), and obtains character information. Moreover, the information recognition unit 279 performs the code detection process on the edge detection results obtained from the second edge detection unit 277 to detect a code (St216). The information recognition unit 279 recognizes the detected code (St217) to obtain code information.

Because a pixel value is interpolated using the third interpolation algorithm suitable for the edge detection by the third interpolation unit 274 as described above (St211), the information recognition unit 279 can recognize the character information and code information with high accuracy.

As described above, in the image processing apparatus 27 according to this embodiment, the first interpolation unit 272 uses the first interpolation algorithm suitable for generating an image to interpolate a pixel value, and the second interpolation unit 272 and the third interpolation unit 274 use the second interpolation algorithm suitable for the edge detection to interpolate a pixel value. Therefore, the image generation unit 275 can generate the entire image having a high visibility, and the area detection unit 278 and the information recognition unit 279 can detect an area and recognize information with high accuracy.

Furthermore, in this embodiment, regarding the area detection (St210) and information recognition (St214 to St217), the pixel value interpolated by different algorithms (the second interpolation algorithm and the third interpolation algorithm) is used to perform the edge detection. Therefore, it is possible to separately use an interpolation algorithm suitable for the area detection (gradient method or the like) and an interpolation algorithm suitable for the information recognition (ACPI method or the like), and to improve the accuracy of the area detection and information recognition as compared with the first embodiment.

Embodiments of the present technology are not limited to the above-mentioned embodiments and various modifications can be made without departing from the gist of the present technology.

In the above-mentioned first embodiment and second embodiment, an interpolation algorithm for edge detection (the second interpolation algorithm or the third interpolation algorithm) was used to interpolate a pixel value. Here, instead of the interpolation of a pixel value for edge detection, it is possible to apply a threshold value to the output value of each light-receiving element to directly binarize it. By performing the information recognition (character recognition or code recognition) on the binarized value, it is possible to perform the information recognition at a high speed and a low burden.

Moreover, in the above-mentioned first embodiment and second embodiment, the area detection and information recognition was performed on the pixel value interpolated by the interpolation algorithm for edge detection (the second interpolation algorithm or the third interpolation algorithm). Here, on the pixel value interpolated by the interpolation algorithm for edge detection, only any one of the area detection and the information recognition may be performed. Moreover, only any one of the character recognition and the code recognition of the information recognition may be performed.

It should be noted that the present technology may also take the following configurations.

(1) An image processing apparatus, including:

an output value obtaining unit that obtains respective output values of a plurality of light-receiving elements from an image sensor including the plurality of light-receiving elements arranged two-dimensionally;

a first interpolation unit that uses a first interpolation algorithm to interpolate a pixel value of a pixel corresponding to the respective light-receiving elements based on the output value;

a second interpolation unit that uses a second interpolation algorithm different from the first interpolation algorithm to interpolate a pixel value of a pixel corresponding to the respective light-receiving elements based on the output value;

an image generation unit that generates an image based on a pixel value of a pixel corresponding to the respective light-receiving elements, which is interpolated by the first interpolation unit; and a first edge detection unit that detects an edge using a first edge detection algorithm based on a pixel value of a pixel corresponding to the respective light-receiving elements, which is interpolated by the second interpolation unit.

(2) The image processing apparatus according to (1) above, in which the first interpolation algorithm is an interpolation algorithm that interpolates the pixel value so that a difference between pixel values of pixels corresponding to adjacent light-receiving elements is small, and the second interpolation algorithm is an interpolation algorithm that interpolates the pixel value so that a difference between pixel values of pixels corresponding to adjacent light-receiving elements is larger than the first interpolation algorithm.

(3) The image processing apparatus according to (1) or (2) above, further including an area detection unit that detects an area based on the detection results obtained from the first edge detection unit.

(4) The image processing apparatus according to any one of (1) to (3) above, further including:

a second edge detection unit that uses a second edge detection algorithm different from the first edge detection algorithm to detect an edge based on the pixel value of the pixel corresponding to the respective light-receiving elements, which is interpolated by the second interpolation unit; and an information recognition unit that recognizes information based on the detection result obtained from the second edge detection unit.

(5) The image processing apparatus according to any one of (1) to (4) above, in which the second interpolation unit performs YUV conversion as well as the interpolation of the pixel value.

(6) The image processing apparatus according to any one of (1) to (5) above, in which the first interpolation algorithm is a linear interpolation method, and the second interpolation algorithm is a gradient method.

(7) The image processing apparatus according to any one of (1) to (6) above, in which the area detection unit detects an area including an edge in the detection results obtained from the first edge detection unit as an observation target area in a sample, and the information recognition unit recognizes a character or code displayed on the sample based on the detection results obtained from the second edge detection unit.

(8) The image processing apparatus according to any one of (1) to (7) above, further including:

a third interpolation unit that uses a third interpolation algorithm that is different from the first interpolation algorithm and the second interpolation algorithm to interpolate a pixel value of a pixel corresponding to the respective light-receiving elements based on the output value; and a second edge detection unit that uses a second edge detection algorithm different from the first edge detection algorithm to detect an edge based on a pixel value of a pixel of each light-receiving element, which is interpolated by the third interpolation unit.

(9) The image processing apparatus according to any one of (1) to (8) above, in which the first interpolation algorithm is an interpolation algorithm that interpolates the pixel value so that a difference between pixel values of pixels corresponding to adjacent light-receiving elements is small, the second interpolation algorithm is an interpolation algorithm that interpolates the pixel value so that a difference between pixel values of pixels corresponding to adjacent light-receiving elements is larger than the first interpolation algorithm, and the third interpolation algorithm is an interpolation algorithm that interpolates the pixel value so that a difference between pixel values of pixels corresponding to adjacent light-receiving elements is larger than the first interpolation algorithm.

(10) The image processing apparatus according to any one of (1) to (9) above, further including:

an area detection unit that detects an area based on the detection results obtained from the first edge detection unit; and an information recognition unit that recognizes information based on the detection results obtained from the second edge detection unit.

(11) The image processing apparatus according to any one of (1) to (10) above, in which the second interpolation unit performs YUV conversion as well as the interpolation of the pixel value, and the third interpolation unit performs YUV conversion as well as the interpolation of the pixel value.

(12) The image processing apparatus according to any one of (1) to (11) above, in which the first interpolation algorithm is a linear interpolation method, the second interpolation algorithm is a gradient method, and the third interpolation algorithm is an advanced color plane interpolation method.

(13) The image processing apparatus according to any one of (1) to (12) above, in which the area detection unit detects the area including an edge in the detection results obtained from the first edge detection unit as an observation target area in a sample, and the information recognition unit recognizes the character or code displayed on the sample based on the detection results obtained from the second edge detection unit.

(14) An image processing program that causes an information processing apparatus to function as:

an output value obtaining unit that obtains respective output values of a plurality of light-receiving elements from an image sensor including the plurality of light-receiving elements arranged two-dimensionally;

a first interpolation unit that uses a first interpolation algorithm to interpolate a pixel value of a pixel corresponding to the respective light-receiving elements based on the output value;

a second interpolation unit that uses a second interpolation algorithm different from the first interpolation algorithm to interpolate a pixel value of a pixel corresponding to the respective light-receiving elements based on the output value;

an image generation unit that generates an image based on a pixel value of a pixel corresponding to the respective light-receiving elements, which is interpolated by the first interpolation unit; and a first edge detection unit that detects an edge using a first edge detection algorithm based on a pixel value of a pixel corresponding to the respective light-receiving elements, which is interpolated by the second interpolation unit.

(15) An image processing method, comprising:

obtaining, by an output value obtaining unit, respective output values of a plurality of light-receiving elements from an image sensor including the plurality of light-receiving elements arranged two-dimensionally;

using, by a first interpolation unit, a first interpolation algorithm to interpolate a pixel value of a pixel corresponding to the respective light-receiving elements based on the output value;

using, by a second interpolation unit, a second interpolation algorithm different from the first interpolation algorithm to interpolate a pixel value of a pixel corresponding to the respective light-receiving elements based on the output value;

generating, by an image generation unit, an image based on a pixel value of a pixel corresponding to the respective light-receiving elements, which is interpolated by the first interpolation unit; and detecting, by a first edge detection unit, an edge using a first edge detection algorithm based on a pixel value of a pixel corresponding to the respective light-receiving elements, which is interpolated by the second interpolation unit.

DESCRIPTION OF REFERENCE NUMERALS

1 microscopic imaging apparatus
17, 27 image processing apparatus
15 image sensor for the entire image/
151 light-receiving element 171 output value obtaining unit
172 first interpolation unit
173 second interpolation unit
174 image generation unit
175 first edge detection unit
176 second edge detection unit
177 area detection unit
178 information recognition unit
271 output value obtaining unit
272 first interpolation unit
273 second interpolation unit
274 third interpolation unit
275 image generation unit
276 first edge detection unit
277 second edge detection unit
278 area detection unit
279 information recognition unit

The invention claimed is:

1. An image processing apparatus, comprising:
circuitry configured to:
obtain a plurality of output values of a plurality of light-receiving elements of an image sensor, wherein the plurality of light-receiving elements are arranged two-dimensionally;
interpolate a first pixel value of a first pixel based on application of a first interpolation algorithm on a first output value of the plurality of output values, wherein the first pixel corresponds to a first light-receiving element of the plurality of light-receiving elements;
interpolate a second pixel value of a second pixel based on application of a second interpolation algorithm on a second output value of the plurality of output values, wherein
the second pixel corresponds to a second light-receiving element of the plurality of light-receiving elements, and
the second interpolation algorithm is different from the first interpolation algorithm;
generate an image based on the interpolated first pixel value of the first pixel; and
detect a first edge based on application of a first edge detection algorithm on the interpolated second pixel value of the second pixel.

2. The image processing apparatus according to claim 1, wherein
a difference between a third interpolated pixel value of a third pixel and a fourth interpolated pixel value of a fourth pixel is smaller than a difference between a fifth interpolated pixel value of a fifth pixel and a sixth interpolated pixel value of a sixth pixel,
the third pixel corresponds to a third light-receiving element of the plurality of light-receiving elements,
the fourth pixel corresponds to a fourth light-receiving element of the plurality of light-receiving elements,
the third light-receiving element is adjacent to the fourth light-receiving element,
the fifth pixel corresponds to a fifth light-receiving element of the plurality of light-receiving elements,
the sixth pixel corresponds to a sixth light-receiving element of the plurality of light-receiving elements,
the fifth light-receiving element is adjacent to the sixth light-receiving element,
the third interpolated pixel value and the fourth interpolated pixel value are interpolated by the first interpolation algorithm, and
the fifth interpolated pixel value and the sixth interpolated pixel value are interpolated by the second interpolation algorithm.

3. The image processing apparatus according to claim 2, wherein the circuitry is further configured to detect an area based on the detected first edge by the first edge detection algorithm.

4. The image processing apparatus according to claim 3, wherein the circuitry is further configured to:
detect a second edge based on application of a second edge detection algorithm on the interpolated second pixel value,
wherein the second edge detection algorithm is different from the first edge detection algorithm; and
recognize information based on the detected second edge by detection result obtained from the second edge detection algorithm.

5. The image processing apparatus according to claim 2, wherein the circuitry is further configured to perform YUV conversion as well as the interpolation of the second pixel value.

6. The image processing apparatus according to claim 2, wherein
the first interpolation algorithm is a linear interpolation method, and
the second interpolation algorithm is a gradient method.

7. The image processing apparatus according to claim 4, wherein the circuitry is further configured to:
detect the area including the first edge as an observation target area in a sample; and
recognize a character or a code displayed on the sample based on the detection result obtained from the second edge detection algorithm.

8. The image processing apparatus according to claim 1, wherein the circuitry is further configured to:
interpolate a third pixel value of a third pixel based on application of a third interpolation algorithm on a third output value of the plurality of output values, wherein
the third interpolation algorithm is different from the first interpolation algorithm and the second interpolation algorithm, and
the third pixel corresponds to a third light-receiving element of the plurality of light-receiving elements; and
detect a second edge based on application of a second edge detection algorithm on the interpolated third pixel value.

9. The image processing apparatus according to claim 1, wherein
a first difference between a third interpolated pixel value of a third pixel and a fourth interpolated pixel value of a fourth pixel is smaller than a second difference between a fifth interpolated pixel value of a fifth pixel and a sixth interpolated pixel value of a sixth pixel,
the third interpolated pixel value and the fourth interpolated pixel value are interpolated by the first interpolation algorithm,
the fifth interpolated pixel value and the sixth interpolated pixel value are interpolated by the second interpolation algorithm,
the third pixel corresponds to a third light-receiving element of the plurality of light-receiving elements,
the fourth pixel corresponds to a fourth light-receiving element of the plurality of light-receiving elements,
the third light-receiving element is adjacent to the fourth light-receiving element, the fifth pixel corresponds to a fifth light-receiving element of the plurality of light-receiving elements,
the sixth pixel corresponds to a sixth light-receiving element of the plurality of light-receiving elements,
the fifth light-receiving element is adjacent to the sixth light-receiving element,
a third difference between a seventh interpolated pixel value of a seventh pixel and an eighth interpolated pixel value of an eighth pixel is larger than the first difference,
the seventh interpolated pixel value and the eighth interpolated pixel value are interpolated by a third interpolation algorithm,
the seventh pixel corresponds to a seventh light-receiving element of the plurality of light-receiving elements,
the eighth pixel corresponds to an eighth light-receiving element of the plurality of light-receiving elements,
the third interpolation algorithm is different from the first interpolation algorithm and the second interpolation algorithm, and
the seventh light-receiving element is adjacent to the eighth light-receiving element.

10. The image processing apparatus according to claim 1, wherein the circuitry is further configured to:
detect an area based on detection results obtained from the first edge detection algorithm; and
recognize information based on detection results obtained from a second edge detection algorithm.

11. The image processing apparatus according to claim 9, wherein the circuitry is further configured to perform:
YUV conversion as well as the interpolation of the second pixel value, and
the YUV conversion as well as the interpolation of the third pixel value.

12. The image processing apparatus according to claim 9, wherein
the first interpolation algorithm is a linear interpolation method,
the second interpolation algorithm is a gradient method, and
the third interpolation algorithm is an advanced color plane interpolation method.

13. The image processing apparatus according to claim 10, wherein the circuitry is further configured to:
detect the area as an observation target area in a sample, wherein the area includes the first edge detected in the detection results obtained from the first edge detection algorithm; and
recognize a character or a code displayed on the sample based on the detection results obtained from the second edge detection algorithm.

14. A non-transitory computer-readable medium having stored thereon, computer-executable instructions which, when executed by a computer, cause the computer to execute operations, the operations comprising:
obtaining a plurality of output values of a plurality of light-receiving elements of an image sensor, wherein the plurality of light-receiving elements are arranged two-dimensionally;
interpolating a first pixel value of a first pixel based on application of a first interpolation algorithm on a first output value of the plurality of output values, wherein the first pixel corresponds to a first light-receiving element of the plurality of light-receiving elements;
interpolating a second pixel value of a second pixel based on application of a second interpolation algorithm on a second output value of the plurality of output values, wherein
the second pixel corresponds to a second light-receiving element of the plurality of light-receiving elements, and
the second interpolation algorithm is different from the first interpolation algorithm;
generating an image based on the interpolated first pixel value of the first pixel; and
detecting a first edge based on application of a first edge detection algorithm on the interpolated second pixel value of the second pixel.

15. An image processing method, comprising:
obtaining a plurality of output values of a plurality of light-receiving elements of an image sensor, wherein the plurality of light-receiving elements are arranged two-dimensionally;
interpolating a first pixel value of a first pixel based on application of a first interpolation algorithm on a first output value of the plurality of output values, wherein the first pixel corresponds to a first light-receiving element of the plurality of light-receiving elements;
interpolating a second pixel value of a second pixel based on application of a second interpolation algorithm on a second output value of the plurality of output values, wherein
the second pixel corresponds to a second light-receiving element of the plurality of light-receiving elements, and
the second interpolation algorithm is different from the first interpolation algorithm;
generating an image based on the interpolated first pixel value of the first pixel; and
detecting an edge based on application of a first edge detection algorithm on the interpolated second pixel value of the second pixel.

16. The image processing apparatus according to claim 1, wherein the circuitry is further configured to execute a correction operation on the interpolated first pixel value of the first pixel.

* * * * *